United States Patent
Daniels, Jr.

(10) Patent No.: US 12,367,516 B2
(45) Date of Patent: Jul. 22, 2025

(54) MARKETPLACE SYSTEM FOR INTERMODAL SHIPPING CONTAINERS

(71) Applicant: Kenneth Wayne Daniels, Jr., Havelock, NC (US)

(72) Inventor: Kenneth Wayne Daniels, Jr., Havelock, NC (US)

( * ) Notice: Subject to any disclaimer, the term of this patent is extended or adjusted under 35 U.S.C. 154(b) by 210 days.

(21) Appl. No.: 18/220,673

(22) Filed: Jul. 11, 2023

(65) Prior Publication Data
US 2025/0022029 A1    Jan. 16, 2025

(51) Int. Cl.
| | | |
|---|---|---|
| G06Q 30/00 | (2023.01) | |
| G06Q 10/083 | (2023.01) | |
| G06Q 30/0201 | (2023.01) | |
| G06Q 30/0283 | (2023.01) | |
| G06Q 30/0601 | (2023.01) | |

(52) U.S. Cl.
CPC ....... G06Q 30/0627 (2013.01); G06Q 10/083 (2013.01); G06Q 30/0206 (2013.01); G06Q 30/0283 (2013.01); G06Q 30/0621 (2013.01); G06Q 30/0641 (2013.01)

(58) Field of Classification Search
CPC .................................................. G06Q 30/0627
See application file for complete search history.

(56) References Cited

U.S. PATENT DOCUMENTS

| | | |
|---|---|---|
| 6,625,584 B1 | 9/2003 | Bains et al. |
| 11,037,261 B2 | 6/2021 | Marchese |
| 2008/0046277 A1 | 2/2008 | Stamets |
| 2014/0101059 A1 | 4/2014 | Hsiao |
| 2015/0012458 A1* | 1/2015 | May .................. G06Q 10/00 705/333 |
| 2015/0161556 A1* | 6/2015 | Jena .................. G06Q 10/083 705/14.23 |
| 2016/0110807 A1 | 4/2016 | Downes |
| 2021/0122506 A1* | 4/2021 | Kiessner ................ B65B 17/02 |
| 2023/0169445 A1* | 6/2023 | Aziz .................... G06T 19/003 705/332 |
| 2024/0354695 A1* | 10/2024 | Haynes .............. G06Q 10/0832 |

OTHER PUBLICATIONS

Volfová, Hana, Eliška Svobodová, and Jana Pechová. "The marketing potential of personalisation of shipping packaging." Marketing Science & Inspirations 17.2 (2022): 16-25.*
https://www.container-xchange.com/container-trading/?utm_source=google&utm_medium=cpc&utm_campaign=AW_INCAUS_NU_CON_en_GSN_T-L_DTMB_CPC_intermodal_container_Phrase&utm_content=intermodal%20container&gclid=CjwKCAjw-IWkBhBTEiwA2exyO7MMNSVypOuuPQmnnPG_SXjqNjKOdohwIQ7n54TNmW0iBYY7wrQ7hxoCdbQQAvD_BwE.

* cited by examiner

Primary Examiner — Kathleen Palavecino
(74) Attorney, Agent, or Firm — Ashley D. Johnson; Dogwood Patent and Trademark Law

(57) ABSTRACT

The invention is relates to a marketplace and management system related thereto. The disclosed system acts as an intermediary between buyers and sellers of shipping containers and provides the related support services. The marketplace generally operates over a network using a user interface with various levels of integration. The related services provided by the marketplace allow buyers and sellers to enroll in the marketplace, maintain their accounts, and track their operations within the marketplace. Sellers can also manage the rates they charge for providing freight transportation.

18 Claims, 4 Drawing Sheets

| ID # | Vendor | Product Name | Color | Condition | Avail. Date | MSRP | Max. Price | Min. Price |
|---|---|---|---|---|---|---|---|---|
| 101 | Jones | A104 | Red | 10 | 1/1/23 | 500 | 600 | 250 |
| 102 | Wilson | A579 | Green | 10 | 6/1/23 | 750 | 850 | 500 |
| 103 | AAA | J690 | Brown | 3 | 5/1/23 | 3000 | 3000 | 1000 |
| 104 | Jones | P100 | Red | 5 | 7/1/23 | 1200 | 1100 | 500 |
| 105 | Jones | P100 | Blue | 7 | 8/1/23 | 4500 | 3500 | 3300 |
| 106 | Wilson | L-150 | Yellow | 8 | 1/5/24 | 900 | 1000 | 1000 |

| | Characteristics | | | | | |
|---|---|---|---|---|---|---|
| ID# | Color | Age | Manufacturer | Distance | Condition | Total |
| 101 | 8 | 5 | 8 | 1 | 3 | 25 |
| 102 | 10 | 2 | 5 | 10 | 8 | 35 |
| 103 | 3 | 7 | 5 | 10 | 9 | 24 |
| 104 | 1 | 10 | 10 | 9 | 9 | 39 |

MARKETPLACE SYSTEM FOR INTERMODAL SHIPPING CONTAINERS

TECHNICAL FIELD

The presently disclosed subject matter is generally directed to a marketplace and management system related to intermodal shipping containers. In particular, the presently disclosed subject matter relates to a marketplace for intermodal shipping containers, the systems necessary to support such a marketplace, and the embodiment of such a marketplace and support systems over a network.

BACKGROUND

Many of the existing internet-based transportation related sites are simply bulletin boards for posting intermodal shipping container supply and demand. Specifically, conventional methods for purchasing shipping containers for consumer or professional use is difficult and convoluted. In current methods, a purchaser buys a shipping container stored in bulk at ports or container depots through an advertisement blindly, without seeing the condition of the container. The purchaser is then later contacted with a rough estimate on delivery date, often varying by weeks or even months. When the container arrives, the purchaser views the product for the first time. Accordingly, current methods of purchasing storage containers do not provide many of services and capabilities needed to match the needs of the buyer with available inventory. Further, traditional internet-based sites do not allow buyers and sellers of intermodal transportation containers to execute their transactions over a network. Instead, buyers and sellers must contact each other offline to transact with each other. It would therefore be beneficial to provide a public sales outlet where purchasers can physically interact with available shipping containers and can select the exact container they want. It would be further beneficial if consumers could visually browse and select specific containers to purchase online or through an online catalog.

SUMMARY

In some embodiments, the presently disclosed subject matter is directed to a method for buying and selling shipping containers that ensures a first user (e.g., purchaser) can view an inventory of shipping containers prior to purchase and shipment.

The system can include providing a database of available shipping containers that can be viewed by potential purchasers. The purchasers can browse through listings of containers and select one or more that meet their specific needs for purchase (e.g., based on color, condition, age, and the like) prior to payment and shipment. Advantageously, potential buyers are able to visually inspect a shipping container prior to purchase, in person or through an online visual database.

In some embodiments, the disclosed method includes determining a price assigned to a shipping container. Specifically, the method includes calculating, by a computing system, an aggregate number associated with each shipping container listed for sale. The aggregate number is determined by assigning a number (e.g., 1-10, with 10 being the best and 1 being the worst) to a variety of characteristics associated with each container (e.g., popularity of container color, age of container, quality of manufacturer, presence of damage, etc.). Additional customized numbers can also be included in the aggregate, such as distance for a particular seller, the seller's history (e.g., favorites are given a higher number based on past order history). The system includes calculating, by the computing system, a cumulative price for each container as a function of the total aggregate number for each container relative to a particular purchaser. Thus, the price associated with one purchaser may be different for the same container based on location relative to the container, customer purchase history, etc. The price is then set by the computing system as a function of the aggregate number for an interested purchaser.

In some embodiments, the presently disclosed subject matter is directed to a computer-implemented method for buying and selling shipping containers under control of one or more computing devices configured with specific computer-executable instructions.

The method includes receiving a request from a first user of a group of users for an empty shipping container included in a database of shipping containers, wherein the request includes one more qualifiers selected from color of the shipping container, age of the shipping container, manufacturer of the shipping container, shape of the shipping container, size of the shipping container, condition of the shipping container, or combinations thereof.

The method includes calculating a value for each container that meets the request qualifiers.

The method includes determining a price for each container that meets the request qualifiers, wherein the price is unique to the first user based on at least one of the location of the user relative to each shipping container that meets the request qualifiers, buying history of the first user, or combinations thereof.

The method includes notifying the first user of the determined price for each shipping container that meets the request qualifiers, and communicating the price of each container that meets the request qualifiers to the first user. If a shipping container is selected for purchase by the first user, proceeding with a sales transaction wherein the shipping container is purchased by the first user.

The method includes shipping the selected shipping container to the first user, wherein the first user has visually selected the shipping container prior to shipping.

In some embodiments, the method further comprises allowing the first user to add a customization to a selected shipping container for an additional price.

In some embodiments, the customization is selected from one or more of painting an interior of the shipping container, painting an exterior of the shipping container, adding one or more windows to a shipping container, performing repairs to the shipping container, and adding doors to the shipping container.

In some embodiments, the selected shipping container is removed from the database after the purchase has been completed.

In some embodiments, the shipping is outsourced to a shipping vendor local to the first user.

In some embodiments, the inventory is viewed through a smart phone, smart watch, laptop computer, tablet computer, desktop computer or personal digital assistant.

In some embodiments, each shipping container is assigned a value corresponding to one or more of the following: popularity of the color of the shipping container, age of the shipping container, popularity of the size of the shipping container, popularity of the shape of the shipping container, condition of the shipping container, popularity of the manufacturer of the shipping container, distance between the first user and the shipping container; wherein the assigned value is used to calculate a price for the shipping container.

In some embodiments, the assigned value corresponds to a unique price relative to the first user compared to other users.

In some embodiments, the database acts as a marketplace for the buying and selling of shipping containers.

In some embodiments, the presently disclosed subject matter is directed to a system comprising one or more non-transitory computer readable storage media, one or more processors, and one or more program modules stored in the one or more non-transitory computer readable storage media and executed by the one or more processors to receive a request from a first user of a group of users for an empty export container included in an inventory of a database of shipping containers. The request also triggers a search in the database for shipping containers that match the request from the first user, wherein the request includes one more qualifiers selected from color of the shipping container, age of the shipping container, manufacturer of the shipping container, shape of the shipping container, size of the shipping container, condition of the shipping container, or combinations thereof. The system then calculates a value for each container that meets the request qualifiers and determines a price for each container that meets the request qualifiers. The price is unique to the first user based on at least one of the location of the user relative to each shipping container that meets the request qualifiers, buying history of the first user, or combinations thereof. The system notifies the first user of the shipping container matches and allows the first user to select and purchase one of the shipping container matches.

DETAILED DESCRIPTION

Figure 1A:
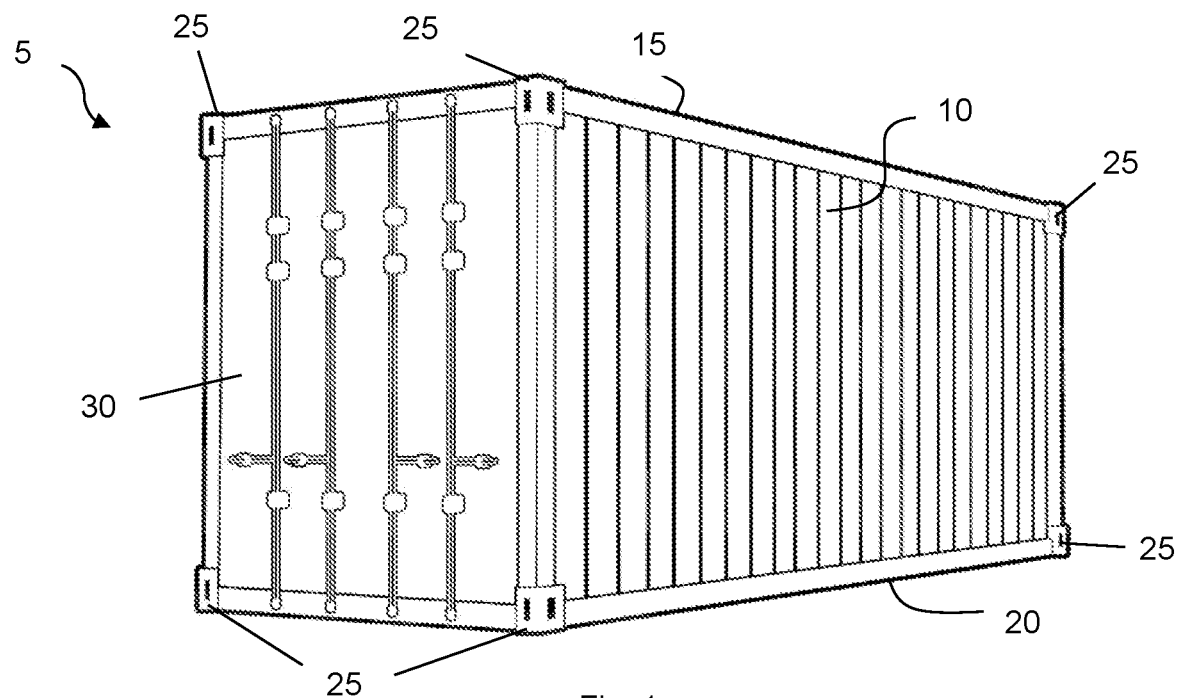
FIG. 1a is a perspective view of an intermodal shipping container in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is directed to a semiautomated or fully automated system and method of offering a variety of storage containers for sale to potential purchasers through an online or in person catalog of available units. Specifically, the system includes allowing purchasers to view and select a desired storage unit for purchase based on various container factors (e.g., size, condition, amount of wear or damage, color, age, location, etc.). In some embodiments, the system further allows a purchaser to customize a selected storage unit, such as by adding paint, doors, windows, interior walls, and the like. The storage container is then directly shipped and delivered to the purchaser, completing the transaction.

Figure 1B:
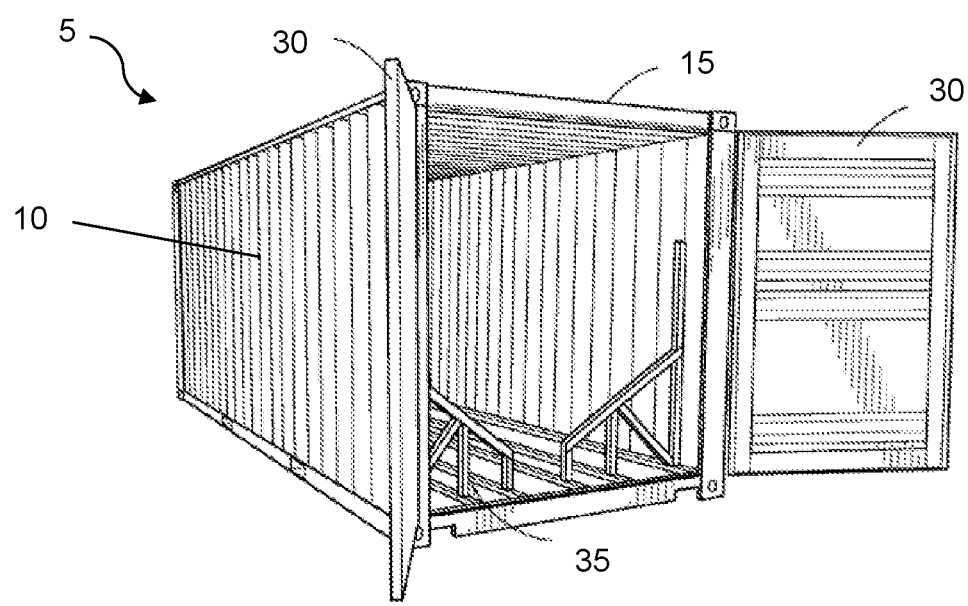
FIG. 1b is a perspective view of an intermodal shipping container with the doors opened and interior exposed in accordance with some embodiments of the presently disclosed subject matter.

The presently disclosed subject matter can therefore include a system, method, and/or business model for the selection and purchase of one or more intermodal shipping containers. As illustrated in FIG. 1a, intermodal shipping container 5 includes standardized containers that are transported primarily by ship, train, and truck. The containers have been conventionally used to move material globally, regionally, and locally. The number of existing containers is large and thus are readily available for sale. As illustrated, container 5 includes a series of connected left, right, front, and rear sidewalls 10, top 15, and bottom 20 that form a closed unit. The containers also come in standardized dimensions and can optionally include castings 25 at the corners for securing container 5 and providing interconnection with other containers. As shown, container 5 is typically configured as a rectangular box made from corrugated steel, although the container can be configured in any shape or size and/or from any rigid material. Container 5 also includes at least one door 30 that allows access to interior 35, as shown in FIG. 1b. It should be appreciated that container 5 can have any of a wide variety of features and is not limited to the size, shape, and/or configurations shown in FIGS. 1a and 1b.

Figure 2:
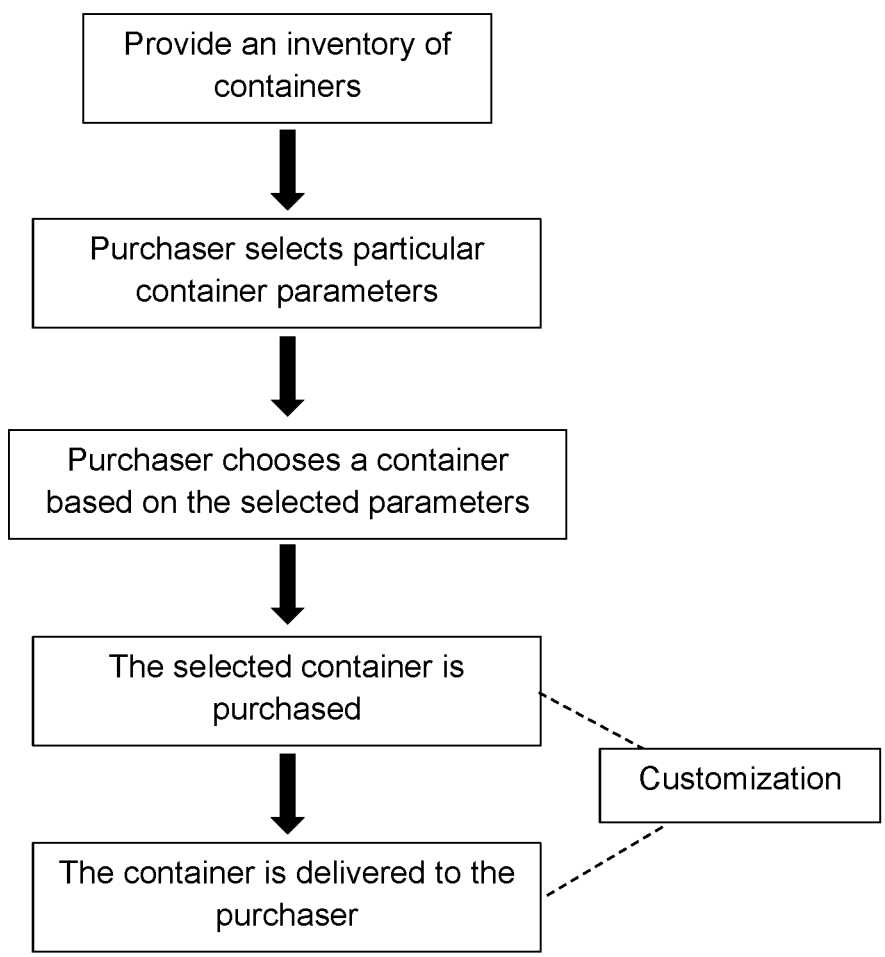
FIG. 2 is a flowchart of one method of using the disclosed container marketplace system in accordance with some embodiments of the presently disclosed subject matter.

The presently disclosed subject matter includes providing a surplus of shipping containers 5, on a physical lot and/or online so that the inventory is visible to the purchaser prior to selection of a container and prior to purchase/delivery. The purchaser is not limited and can be a transport company, individual consumer, small business, and the like. As shown in the flowchart of FIG. 2, the system includes providing an inventory of available containers 5 that can be viewed by a purchaser (e.g., by going to a central website, accessing a mobile application, and the like). In some embodiments, the system can suggest matches for the user based on specified parameters, such as age of the container, condition of the container, color of the container, and the like. The user can select a desired container and then complete the purchase. Optionally, the container can be customized through the addition/removal of paint, doors, windows, etc. The seller coordinates with local delivery or provides delivery services to the purchaser after the sale is complete. Importantly, the purchaser receives a selected container 5 that has been previewed and approved by the purchaser prior to shipment. In this way, purchaser satisfaction is increased and receipt of the container during delivery ensures that the desired container parameters are met in advance.

Figures 3, 4:
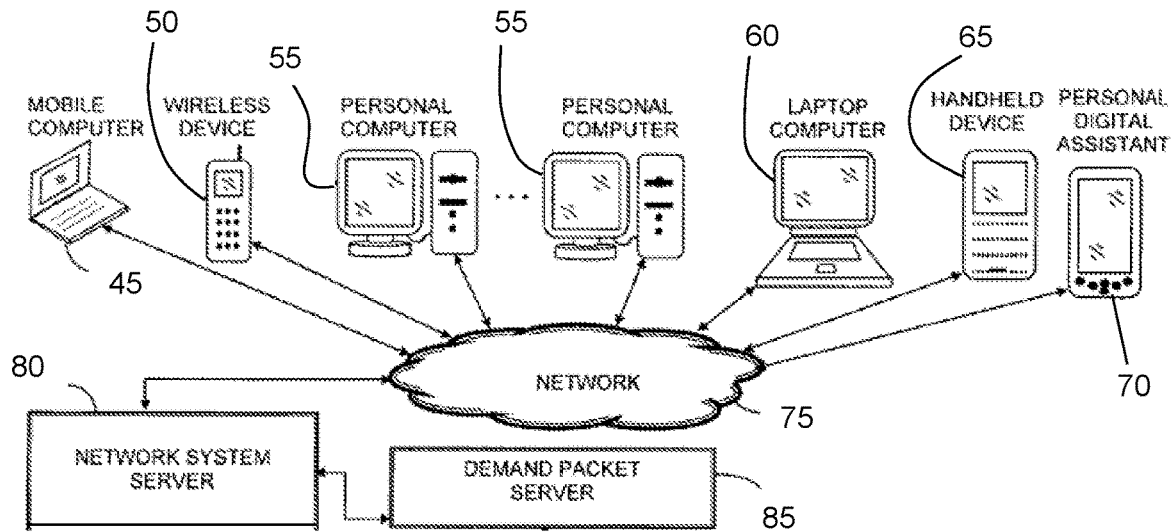
FIG. 3 is a schematic illustrating viewing/purchasing of inventory on a computer or other digital device in accordance with some embodiments of the presently disclosed subject matter.
FIG. 4 is an image of a representative container record stored and viewed in a system database in accordance with some embodiments of the presently disclosed subject matter.

Thus, the presently disclosed subject matter includes a system and method of providing an inventory of containers 5 that a purchaser can interact with and/or visually inspect prior to purchasing. In some embodiments, the purchaser can interact with containers 5 in person (e.g., by touching, viewing the containers at a physical location). In other embodiments, the purchaser can view the inventory on a computer or other digital device. For example, as shown in FIG. 3, a mobile computer user 45, wireless device user 50, personal computer user(s) 55, laptop computer user 60, handheld device user 65, and/or personal digital assistant user 70 (collectively, the "user") through a network 75 (such as the internet) connects to a network system server 80 that is in direct communications with a demand packet server 85. The demand packet server includes the database of inventory of containers 5.

The container database is configured to store a plurality of records, each record corresponding to an assigned container 5. In some embodiments, each container can therefore be assigned a value for one or more container identifiers. Suitable identifiers can include (but are not limited to) year built, manufacturer, years in use, serial or other identification number, color, construction material, presence of rust, condition, amount of damage, presence of doors, presence of windows, availability date, price, location, location relative to purchaser, and the like. FIG. 4 illustrates a representative container identifying record of the database.

As shown, a product identifier can uniquely identify a container in the product offering (e.g., using serial or other identifier), the vendor name identifying the manufacturer of the product, the product name identifying the make/model of the container, the product description (e.g., color, size, etc.), the condition (e.g., a numerical value 1-10 with 1 being worst and 10 being best), the available date identifying the date on which the container will be available through the system, the MSRP identifying the manufacturer's retail price for the product, the pricing range maximum and minimum, identifying the maximum/minimum price of the container. It should be appreciated that the record illustrated in FIG. 4 is one representative record and any of a variety of parameters can be entered, stored, and/or viewed in the database.

Thus, the present invention relates to a marketplace for the buying and selling of intermodal shipping containers. The marketplace facilitates the buying and selling of containers and also provides services that support buying and selling. For example, the support services allow customers to optionally enroll in the marketplace, maintain their accounts, and track their activities within the marketplace. Sellers can also manage the rates charged for inventory (e.g., the price associated with a particular container, delivery fees, etc.). Additionally, the marketplace creates a binding agreement between buyers and sellers, as well as ensuring payment to the seller.

The marketplace generally operates over a network, wherein a network generally comprises a net-like combination or pattern in which different elements are joined (e.g., groups of interconnected computers and the hardware and software used to connect them, such as, internet, phone, LAN, and wireless systems). As noted above, the marketplace can be a software-based system that is implemented over the internet. The architecture of the internet-based embodiment generally includes an application server cluster, a back office system, and a user interface portion. The majority of the software that implements the marketplace is stored and run on one or more data processing components that are part of the application server cluster. The back office system includes at least one database for storing information relating to the marketplace, and back office systems such as invoicing and customer support and provides links to third party servers.

The user interface portion of the system provides the software interface that allows communication among and access to users and their systems and the marketplace. Additionally, it provides a fire wall for security purposes. The user interface portion not only facilitates communication among users, their systems, and the marketplace, but allows users and their systems to access the marketplace and the marketplace to access the user's systems. In other words, the user interface portion provides integration among users, the systems, and the marketplace.

Figures 5, 6:
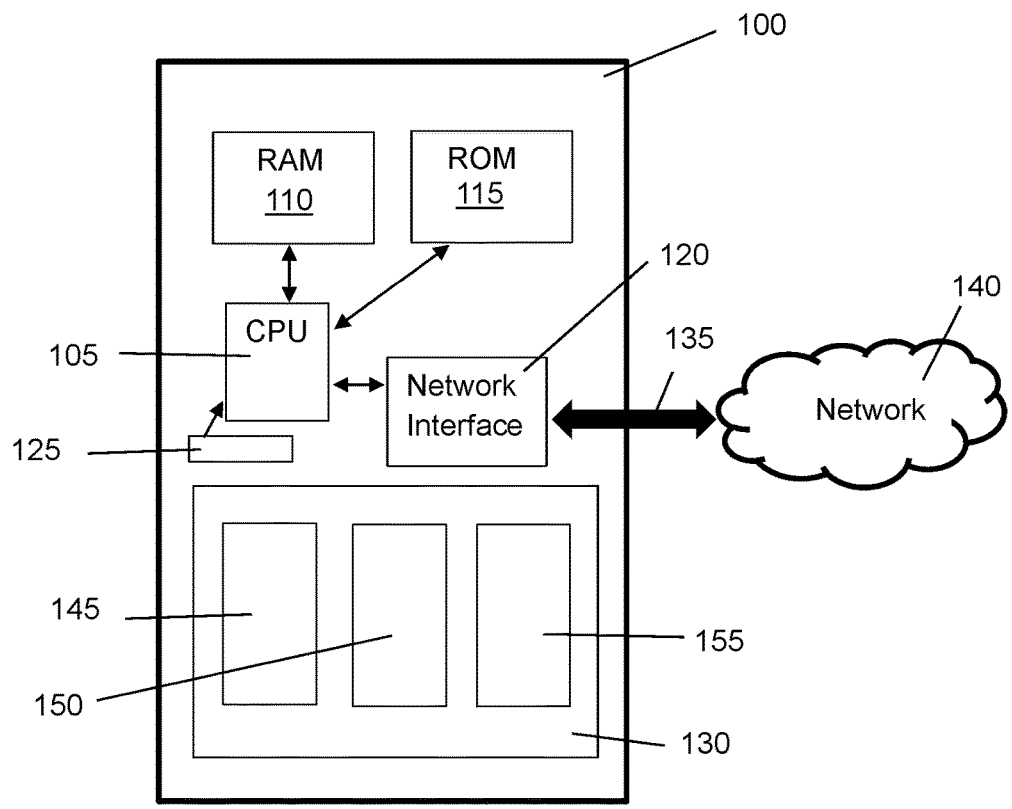
FIG. 5 is one example of a block diagram of a network system server in accordance with some embodiments of the presently disclosed subject matter.
FIG. 6 is one example of a container assigned number in a database in accordance with some embodiments of the presently disclosed subject matter.

FIG. 5 is one example of a block diagram of a network system server 100. The network system server includes processor 105, and connected thereto, random access memory 110, read-only memory 115, a network card 120, system clock 125, and storage device 130. The network card can be any network card capable of handling numerous logical connections 135 to network 140, as required by the number of customers, fulfillment destinations, financial transaction processors, and logical connections to the demand packet server requiring resources from the network system server. The storage device can be any storage device capable of maintaining product database 145, customer sales database 150, and financial and credit processor 155, such as a hard drive, storage area network, redundant array of inexpensive disks, or other mass storage device.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

According to various embodiments of the present invention, client-side users are prospective buyers of shipping containers that may search for, view, and otherwise interact with online marketplace content, such as e-commerce enabled advertisements for shipping containers. The purchaser can view and select a particular container for purchase using a computer implemented method in some embodiments. In some embodiments, the purchaser can select or filter the database based on container size, container shape, container color, container condition, pick up or drop off location, or combinations thereof. Thus, the system allows for comparing a purchaser query or list of requirements with a database of containers.

In some embodiments, the disclosed method can comprise generating a user interface that enables a potential purchaser to view, filter and manage a plurality of information relating to the displayed inventory of empty containers available for purchase. The disclosed method and system may be further configured to recommend (or suggest) matches between available containers and an individual purchaser. The recommended matches may, for example, be based at least in part on the type of container, manufacture date, location of container, required delivery date, type of transport vehicle, color, condition, age of the container, and the like.

The method can include notifying the purchaser of available matches for any parameters selected. For example, the recommended container matches may be displayed on a dashboard and/or sent as push notifications or alerts to mobile devices associated with the individual users. A plurality of recommended container matches, for example the best five recommended matches of containers for exchange, may be generated and notified to the individual users. Data relating to the recommended matching export and import containers may be displayed to individual users by dashboards. The individual users may then accept or reject offers to exchange the recommended matching containers as described above. The purchaser can then select a desired container for purchase and make payment.

In some embodiments, the system allows for unique pricing of each container 5 in the database. For example, each storage container can be uniquely priced based on several different container characteristics. The color of the container can be assigned a number from 1-10, with more desirable colors assigned higher numbers (e.g., red=10, blue=9, green=8, yellow=7, orange=6, brown=5, grey=4, white=3, black=2, and purple=1). The "desirable color" can be determined based on the number of prior sales of a particular model of container. Thus, a more highly desired (e.g., popular) color is assigned a higher value for this particular characteristic, resulting in a higher overall price. If the most popular color (e.g., most sold) color of containers is blue, all blue containers are awarded the highest value for color. The second most popular color is assigned the second highest number, and so forth.

Similarly, the condition of each container in the database can also be assigned a value of 1-10, with the best quality containers awarded a higher number compared to a container of lesser quality. The quality of the containers can be visually inspected by the seller or other operator and a value (number) assigned. The condition of the container can be determined based on the presence or absence of rust, holes, dents, repair, cracks, chipped paint, and the like. Thus, a container with a condition number higher than a second container is in better relative condition.

The database can also include data, such the make, model, serial number, year constructed, years in use, and the like. In some embodiments, the most newly constructed containers are given a higher number than older containers. Similarly, desired makes, models, and associated manufacturers of containers (determined by past data indicating how quickly a container is sold and the number of containers having that feature are sold) can also be assigned a number (e.g., popular makes/models are given a higher number than more unpopular models). Other data, such as the distance between the container and the delivery location can also be considered and assigned a number (e.g., within 20 miles, 50 miles, 100 miles, etc., with the closer location given a higher number). One example of a container parameter in the database is illustrated in FIG. 6.

Using the numbers assigned to each container 5, a price can be set. In some embodiments, the higher a total number associated with a particular container is (e.g., the more desirable the container is), the higher the price. In this way, the price for a particular container can dynamically change based on the popularity of a particular container. One example is shown in FIG. 6. In the database entry associated with container 101-104, container 104 is the most desirable (determined by the highest score of 39). As such, the price of container 104 will be at a premium (or greater than lesser desired containers with lower total numbers). In some embodiments, one or more of the numbers assigned to each container can be purchaser specific. For example, the closer a particular container is to a purchaser, the greater the number (e.g., the greater the value to the purchaser and the greater the cost thereby associated with the container). Similar values can be assigned to containers based on prior user preferences. For example, if a user consistently selects containers manufactured by a specific company, all of the containers manufactured by that value are given a higher number (which increases the price to that purchaser).

After a purchaser selects an acceptable storage container based on age, color, condition, price, etc., an order is placed and a cash flow for a payment is processed via the system. The system then communicates a logistic flow of supplying the selected container to the purchaser. The method also includes confirming purchase by automatically confirming on a selection screen that a purchase has been made. Alternatively, the system and method can automatically send an email, text message, in-app notification, or any other suitable type of notification to the purchase after the purchase has been completed. After the purchase has been completed, the purchased container 5 is removed from the database of inventory.

In some embodiments, a selected container can also be customized by the seller or a third party prior to shipment to the purchaser. Suitable customizations can include (but are not limited to) repainting the container interior or exterior, adding windows, adding or replacing doors, repairing damage, and the like. The customizations may be quoted and paid for through the system.

The disclosed system and method offers many advantages over current systems of selling empty storage containers. For example, purchasers are able to view in person or view an online database the inventory of storage containers available for purchase. The containers are not randomly shipped to a seller as is current practice.

The disclosed system and method allows a user to filter available inventory results based on a variety of factors, such as age, color, and the like to get optimum matches.

Purchaser satisfaction is improved since the received shipping container closely matches the desired container.

The system conveniently allows for customization of a particular storage unit to be made after purchase is completed.

The system can include adjusting the price based on the popularity of a desired container by assigning a cumulative score to each container relative to a particular seller. Thus, the price associated with one container for a first purchaser may be different than for a second purchaser (e.g., based on the purchaser histories, purchaser location, and the like).

Exemplary embodiments of the methods and components of the presently disclosed subject matter have been described herein. As noted elsewhere, these embodiments have been described for illustrative purposes only, and are not limiting. Other embodiments are possible and are covered by the presently disclosed subject matter. Such embodiments will be apparent to persons skilled in the relevant art(s) based on the teachings contained herein. Thus, the breadth and scope of the present invention should not be limited by any of the above-described exemplary embodiments but should be defined only in accordance with the following claims and their equivalents.

What is claimed is:

1. A computer-implemented method for buying and selling shipping containers under control of one or more computing devices configured with specific computer-executable instructions, the method comprising:
   receiving a request from a first user of a group of users for an empty shipping container included in a database of shipping containers, wherein the request includes qualifiers selected from color of the shipping container, age of the shipping container, manufacturer of the shipping container, shape of the shipping container, size of the shipping container, condition of the shipping container, or combinations thereof;
   calculating a unique value for each container that meets the request qualifiers, where the value is calculated by assigning a number to each specific qualifier based on a desirability of each specific qualifier, and the number assigned is higher if there is a high desirability based on prior sales of containers in the database of shipping containers compared to a low desirability based on prior sales of containers in the database of shipping containers, where the number assigned to each of the qualifiers is added to total to the value;
   determining a price for each container that meets the request qualifiers, wherein the price is unique to the first user based on at least one of the location of the user relative to each shipping container that meets the request qualifiers, buying history of the first user in combination with the total value, where a container with a first value will have a higher price compared to a container with a second value when the first value is greater than the second value;
   notifying the first user of the determined price for each shipping container that meets the request qualifiers;
   communicating the price of each container that meets the request qualifiers to the first user;
   if a shipping container is selected for purchase by the first user, proceeding with a sales transaction wherein the shipping container is purchased by the first user;
   shipping the selected shipping container to the first user, wherein the first user has visually selected the shipping container prior to shipping.

2. The method of claim 1, further comprising allowing the first user to add a customization to a selected shipping container for an additional price.

3. The method of claim 2, wherein the customization is selected from one or more of painting an interior of the shipping container, painting an exterior of the shipping container, adding one or more windows to a shipping container, performing repairs to the shipping container, and adding doors to the shipping container.

4. The method of claim 1, wherein the selected shipping container is removed from the database after the purchase has been completed.

5. The method of claim 1, wherein shipping is outsourced to a shipping vendor local to the first user.

6. The method of claim 1, wherein the inventory is viewed through a smart phone, smart watch, laptop computer, tablet computer, desktop computer or personal digital assistant.

7. The method of claim 1, wherein each shipping container is assigned a value corresponding to one or more of the following: popularity of the color of the shipping container, age of the shipping container, popularity of the size of the shipping container, popularity of the shape of the shipping container, condition of the shipping container, popularity of the manufacturer of the shipping container, distance between the first user and the shipping container;
   wherein the assigned value is used to calculate a price for the shipping container.

8. The method of claim 7, wherein the assigned value corresponds to a unique price relative to the first user compared to other users.

9. The method of claim 1, wherein the database acts as a marketplace for the buying and selling of shipping containers.

10. A system, comprising:
   one or more non-transitory computer readable storage media;
   one or more processors; and
   one or more program modules stored in the one or more non-transitory computer readable storage media and executed by the one or more processors to:
      receive a request from a first user of a group of users for an empty export container included in an inventory of a database of shipping containers;
      search the database for shipping containers that match the request from the first user, wherein the request includes one more qualifiers selected from color of the shipping container, age of the shipping container, manufacturer of the shipping container, shape of the shipping container, size of the shipping container, condition of the shipping container, or combinations thereof;

calculate a unique value for each container that meets the request qualifiers by assigning a number to each qualifier based on a desirability of each qualifier, and the number assigned is higher if there is a high desirability based on prior sales of containers in the database of shipping containers compared to a low desirability based on prior sales of containers in the database of shipping containers, where the number assigned to each of the qualifiers is added to total to the value;

determine a price for each container that meets the request qualifiers, wherein the price is unique to the first user based on at least one of the location of the user relative to each shipping container that meets the request qualifiers, buying history of the first user, in combination with the total value, where a container with a first value will have a higher price compared to a container with a second value when the first value is greater than the second value;

notify the first user of the shipping container matches;

allow the first user to select and purchase one of the shipping container matches.

11. The system of claim 10, further comprising an option that allows the first user to add a customization to a selected shipping container for an additional price.

12. The system of claim 11, wherein the customization is selected from one or more of painting an interior of the shipping container, painting an exterior of the shipping container, adding one or more windows to a shipping container, performing repairs to the shipping container, and adding doors to the shipping container.

13. The system of claim 10, wherein the selected shipping container is removed from the database after the purchase has been completed.

14. The system of claim 10, wherein shipping is outsourced to a shipping vendor local to the first user.

15. The system of claim 10, wherein the inventory is viewed through a smart phone, smart watch, laptop computer, tablet computer, desktop computer or personal digital assistant.

16. The system of claim 10, wherein each shipping container is assigned a value corresponding to one or more of the following: popularity of the color of the shipping container, age of the shipping container, popularity of the size of the shipping container, popularity of the shape of the shipping container, condition of the shipping container, popularity of the manufacturer of the shipping container, distance between the first user and the shipping container;

wherein the assigned value is used to calculate a price for the shipping container.

17. The system of claim 10, wherein the assigned value corresponds to a unique price relative to the first user compared to other users.

18. The system of claim 10, wherein the database acts as a marketplace for the buying and selling of shipping containers.

* * * * *